United States Patent [19]

Vogelman et al.

[11] 3,890,461

[45] June 17, 1975

[54] TICKET OPERATED SUBSCRIPTION TELEVISION RECEIVER

[75] Inventors: Joseph H. Vogelman, Roslyn; Stanley D. Spiegelman, Old Bethpage; Jack Berens, Laurelton, all of N.Y.

[73] Assignee: TheatreVision, Inc., Woodbury, L.I., N.Y.

[22] Filed: Mar. 27, 1973

[21] Appl. No.: 345,366

[52] U.S. Cl. ..... 178/5.1; 178/DIG. 13; 340/149 A

[51] Int. Cl. .......... H04n 1/44

[58] Field of Search .......... 178/5.1, DIG. 13; 340/149 A

[56] References Cited

UNITED STATES PATENTS

| | | | |
|---|---|---|---|
| 3,531,582 | 9/1970 | Walker | 178/5.1 |
| 3,564,214 | 2/1971 | Cooper, Jr. | 340/149 A |
| 3,604,900 | 9/1971 | Kalt | 340/149 A |
| 3,668,307 | 6/1972 | Face et al. | 178/5.1 |
| 3,736,368 | 5/1973 | Vogelman et al. | 178/5.1 |
| 3,736,369 | 5/1973 | Vogelman et al. | 178/5.1 |
| 3,777,053 | 12/1973 | Wittig et al. | 178/5.1 |

*Primary Examiner*—Maynard R. Wilbur
*Assistant Examiner*—S. C. Buczinski
*Attorney, Agent, or Firm*—Hopgood, Calimafde, Kalil, Blaustein & Lieberman

[57] ABSTRACT

A subscription television receiver for receiving a scrambled television signal includes a card or ticket reader into which a ticket having a unique coding pattern is placed. The card reader comprises a circuit for developing a card identification signal corresponding to the ticket code pattern. That signal is compared with a program identification signal that is periodically transmitted to the receiver along with the scrambled television signal. When a predetermined correlation between the card and program identification signals is detected, an enabling signal is produced to unscramble the received television signal and thereby permit the received program to be viewed in unscrambled form. In another aspect of the invention, the card contains additional coding which is sensed in the card reader to produce a channel select signal to enable the receiver to receive one of a plurality of programs. In yet another aspect of the invention, a card identification signal is transmitted along with other signals to enable the subscriber to retransmit data that can be used for polling or billing purposes.

20 Claims, 8 Drawing Figures

TICKET OPERATED SUBSCRIPTION TELEVISION RECEIVER

The present invention relates generally to television systems, and more particularly to a subscription television receiver.

Many different types of subscription or pay television systems have been developed, and several such systems are still in use. The major advantage of subscription television systems is their ability to make available to their subscribers, programming of a generally higher quality and often narrower viewer appeal than that usually available over the commercial non-subscription channels. In a typical subscription television system, the video and usually the audio portion as well are transmitted in scrambled or unintelligible form by modifying one or more characteristics of the transmitted signal so that the received signal is unintelligible when viewed by a non-subscriber. The subscribers to the system are each provided with the necessary equipment to unscramble the received television signal to provide a normal, to wit, intelligible or unscrambled television signal.

One serious problem that has been widely encountered by operators of subscription television systems and which has, in many instances caused the operators of such systems to go out of business, is the difficulty in collecting the fees from the subscribers in payment for the use of the unscrambling equipment to permit them to receive and view intelligible programs. Operators of subscription television systems, who typically charge a flat monthly rate to their subscribers irrespective of the number of programs selected for viewing by the subscriber, have also been generally unable to charge their subscribers in a manner which fairly reflects each subscriber's use of the system.

In copending application Ser. No. 234,014, filed Mar. 13, 1972, now U.S. Pat. No. 3,736,369, entitled "Technique for Encoding and Decoding Scrambled T.V. Transmissions by the Simultaneous Transmission of the Encoding and Decoding Signals", assigned to the assignee of the present application, there is disclosed a subscription television system in which the scrambled received television signal is decoded or unscrambled only upon the insertion of a program select card or ticket into a card-receiver device or card reader. The program-select card contains a coded conducting pattern that corresponds to the program which the subscriber wishes to view. When the coded card, which may be purchased or ordered in advance by the subscriber, is inserted into the card-reader, a decoding signal transmitted along with the scrambled television signal and detected at the receiver becomes effective to unscramble the received television signal to thereby permit an unscrambled television signal to be viewed by the subscriber. One advantage of this system over many of the conventional subscription television systems is that the subscriber need pay for only those programs in which he is interested. The use of a ticket as the program select and unscrambling element also makes the use of a subscription television receiver by a guest at a hotel more convenient than has heretofore been possible. In addition, program selection by the purchase of a program select ticket more closely simulates going out to a movie or to the theatre, and increases the subscriber's overall viewing enjoyment.

Another subscription television system that uses a coded card or ticket for program selection is disclosed in application Ser. No. 221,700, filed Jan. 28, 1972, now U.S. Pat. No. 3,376,368, entitled "Technique for Encoding and Decoding T.V. Transmissions by Means of a Coded Electronic Ticket", which is also assigned to the assignee of the present application. In the latter system, the program-select card, when inserted into the card reader, causes a control signal to actuate a normally deactuated local oscillator, which, when thus actuated, causes the carrier of the received subscription signal to be translated to the carrier signal of a designated channel on which the television program is viewed.

The present invention is an extension and improvement over the systems disclosed in said co-pending applications and has as one of its objects the provision of a subscription television system which has all the advantages and convenience of use of these earlier systems, but which increases the flexibility and scope of use of the program select card as well as the number of different programs that can be transmitted to the subscribers for their selection.

It is a further object of the invention to provide a subscription television system of the type described which permits the use of improved scrambling and unscrambling techniques.

It is another object of the invention to provide a subscription television system of the type described which permits billing or polling information to be retransmitted to the source of the television signal.

It is yet a further object of the invention to provide a subscription television system of the type described in which reception of an intelligible television signal without the prior acquisition of a program-select card is extremely difficult and all but impossible.

In the subscription television system of the invention, the video and audio portions of the received television signal are scrambled. The insertion of a program-select card or ticket into the card reader produces an enabling signal to enable an unscrambling or decoding circuit to permit an intelligible television program to be viewed at a designated channel. The program-select card contains a series of conducting surfaces arranged in a preselected pattern, and the card reader includes an array of conducting surfaces arranged in a plurality of intersecting rows and columns. The insertion of a program-select card into the card reader causes the latter to produce a card identification signal corresponding to the conducting surface pattern on the card.

The transmitted television signal includes a unique program-identification signal which is detected at the receiver and compared to the card-identification signal produced at the card reader. The unscrambling enabling signal is produced when a predetermined correlation is detected between the card and program-identification signals.

To enable the subscriber to select one of a plurality of simultaneously transmitted scrambled television programs, the receiver may also inclcude, as in one embodiment of the invention herein disclosed, a plurality of normally deactuated local oscillators, each of which is capable of producing, when actuated, a mixing signal at a different frequency. The program select card contains additional conducting surfaces, which, when the card is inserted into the card reader, are effective to produce a program-select signal that actuates one of the local oscillators so that the carrier of only the selected program is translated for viewing at the designated channel.

The receiver system of the invention may also include a circuit for destroying the program-select card upon the completion of a program transmission period. In addition, the system may be employed with a subscriber identification ticket to retransmit polling or billing information in binary form back to the program source.

To the accomplishment of the above and to such further features as many hereinafter appear, the present invention relates to a subscription television receiver substantially as defined in the appended claims and described in the following detail specification as considered together with the drawings in which:

FIGS. 1A and 1B when combined as indicated constitute a schematic diagram in block form of a subscription television receiver system according to one embodiment of the invention;

FIG. 2 is a series of timing diagrams of signals employed in the operation of the receiver of FIG. 1;

FIGS. 3A and 3B when combined together constitute a schematic diagram in block form of a subscription television receiver according to an alternate embodiment of the invention;

The subscription television receiver illustrated in FIG. 1 receives a plurality of scrambled television signals at different carrier frequencies. An interfering or scrambled carrier modulated with 4.5 MHz situated between the band edge and the video carrier, and nominally 150 KHz below the video carrier, is transmitted simultaneously with the video and audio signals. The resultant simultaneous reception of the scrambling signal and the regular television signal results in the reception of a scrambled picture and an incomprehensible audio portion.

A unique program identification signal is periodically transmitted along with the scrambled television signal and is detected at the receiver. The insertion of a properly coded program select card into a card reader in the receiver produces a program select or card identification binary signal which is correlated to the program-identification signal. Upon the detection of the required correlation between the program-identification and card-identification signals, an enabling signal is produced in the receiver to actuate unscrambling elements in the receiver which permits the subscriber to view an intelligible television program free from the interference that was introduced to the television signal at the transmitter.

If desired, and as herein described, the program select card may also include an additional coded area for producing an actuating signal for a selected local oscillator to enable the receiver to select one of several simultaneously transmitted scrambled television programs.

Figure 1A:
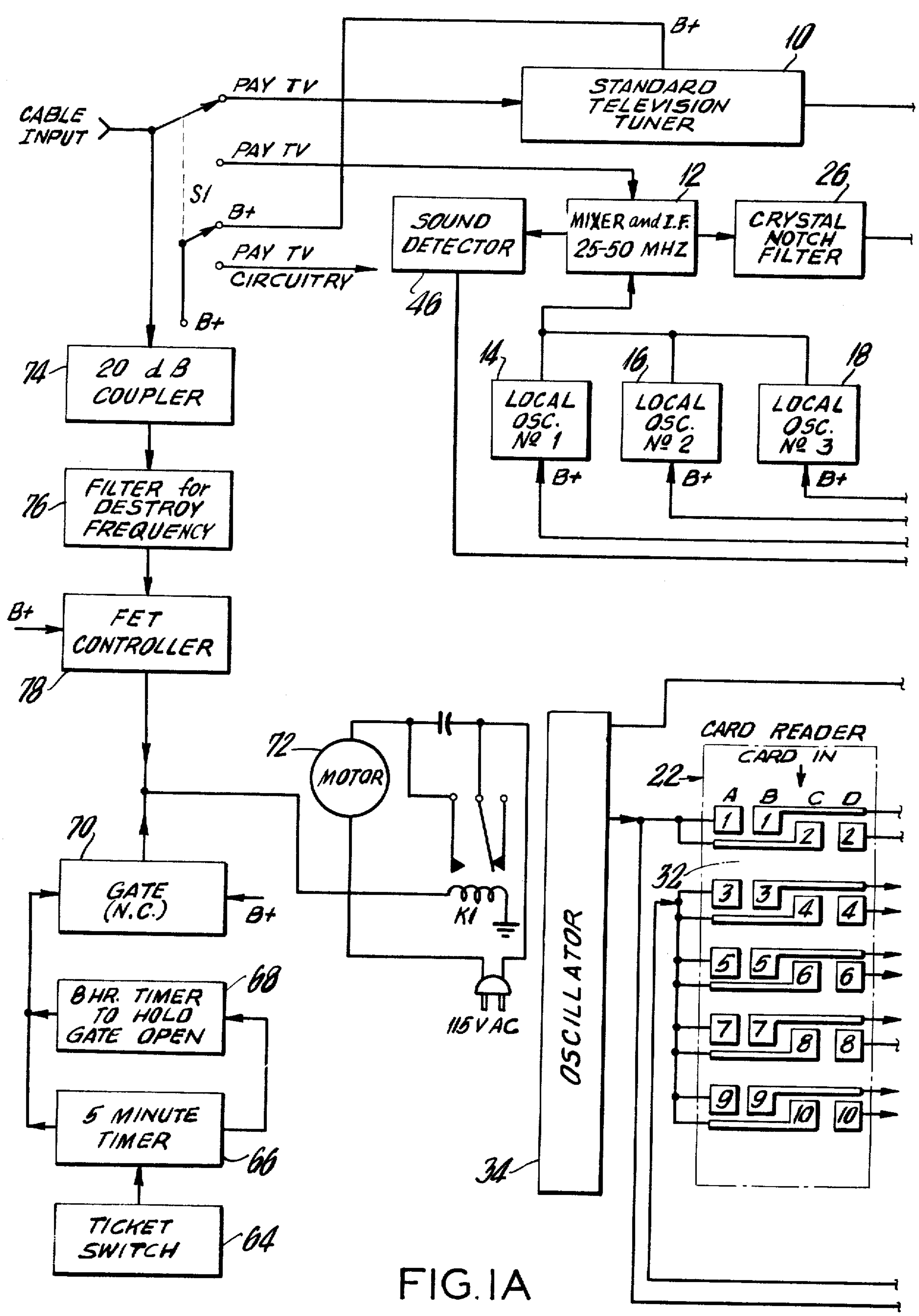
Figure 1B:
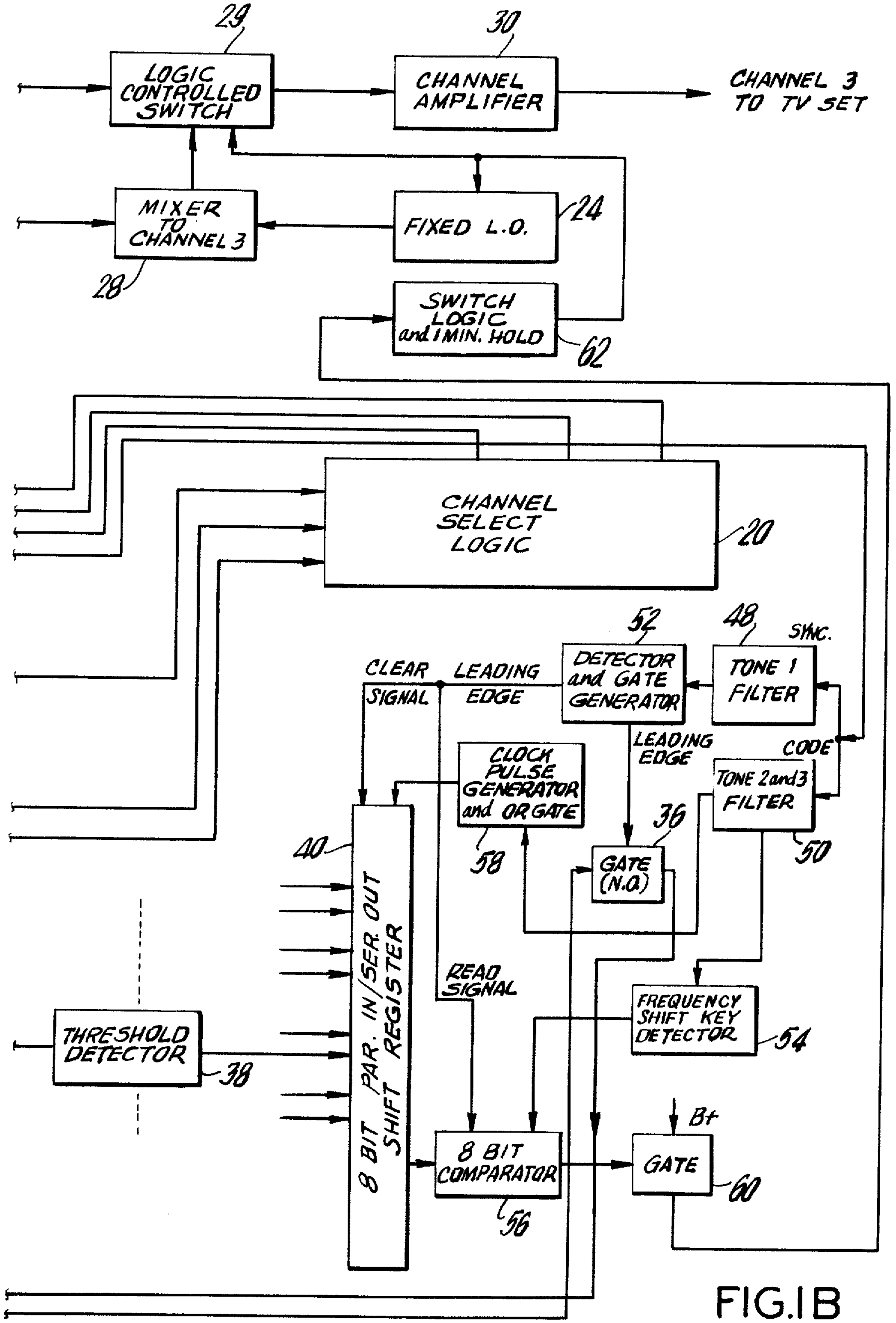

Referring now to the embodiment of the invention illustrated in FIGS. 1A and 1B, the subscription television receiver therein illustrated is capable of receiving both conventional television programs as well as scrambled television programs in accordance with the position of a cable input selector switch S1, which, when in a position to receive conventional programs, applies a B+ voltage to a standard television tuner 10 and the input signal from the cable to the input stage of tuner 10. When the selected switch is in the pay TV position, the B+ voltage is removed from tuner 10, which is thereby turned off, and is applied instead to the pay television receiving circuitry to be described. At the same time, the pay television signal is applied to one input of a mixer and I.F. stage 12.

As herein shown, the received pay television signal includes three different scrambled television signals, each having a different carrier frequency. Accordingly, a second input of mixer 12 is connected to the outputs of three normally deactuated local oscillators 14, 16, and 18. The operation of local oscillators 14, 16, and 18 is controlled by a channel select logic circuit 20 which in turn receives a channel select signal produced by a card reader 22 in a manner to be more completely described below. Channel select circuit 20 processes the channel select signal from the card reader to develop an enabling signal for one of the local oscillators 14, 16, or 18. The ouput of the thusactuated local oscillator is applied to mixer 12 to translate the carrier of the selected received television signal to a frequency which, after subsequent mixing, as will be described, can be viewed on the designated pay television channel, e.g., channel 3.

The unscrambling circuit of the receiver comprises a normally deactuated fixed oscillator 24, which is enabled or actuated in a manner to be more completely described in a following portion of the specification, and a crystal notch filter 26, which has a notch centered at the center frequency of the interfering signal. The outputs of oscillator 24 and filter 26 are each applied to a mixer 28 which heterodynes the two signals to produce an unscrambled television signal at a frequency suitable for viewing on a designated channel of a conventional television receiver.

In a significant aspect of the invention, the enabling of the unscrambling circuits 24 and 26 and the enabling of one of the program-select local oscillators 14, 16, or 18 are both initiated by the insertion of a coded program select card or ticket into card reader 20, only when the card contains a unique program select code pattern corresponding to one of the transmitted programs. The card reader 20 includes, as shown in FIG. 1A, an array of pairs of conducting surfaces 1—1 through 10—10 arranged in a plurality of mutually intersecting rows and columns on an insulating backing 32. The pairs of conducting surfaces 1—1 and 2—2, in the embodiment of FIG. 1, are employed in operative cooperation with specified conducting surfaces on the program-select card to select the desired program. Pairs of conducting surfaces 3—3 to 10—10 are similarly employed in operative cooperation with other conducting surfaces on the program-select card to produce a binary card-identification signal which, when matched or otherwise correlated with a program identifying signal transmitted along with the television signal, produces an unscrambling enabling signal.

As shown in FIG. 1A, two pairs of conducting surfaces are arranged in each row of the card reader array (for example, the third row of the array contains pairs of conducting surfaces 5—5 and 6—6) such that the card reader array contains six rows of conducting surfaces arranged in four columns, A, B, C, and D. One of the conducting surfaces in each pair of conducting surfaces is connected to one surface of the other pair in the same row. The connected surfaces of conducting surface pairs 1—1 and 2—2 are connected to the output of a pulsed oscillator 34, and the unconnected surfaces of those surface pairs are respectively connected to the inputs of channel select logic circuit 22. The conducting surface pairs 1—1 and 2—2 produce either a logic "1" or logic "0" signal to the inputs of channel select logic circuit 22 depending on the presence or absence of a conducting surface on the program-select card, in a manner described in greater detail in a later portion of this specification.

The connected surfaces of conducting surface pairs 3—3 through 10—10 are connected in common to the ouput of a normally open gate 36 which receives a signal from oscillator 34 at one of its inputs. The unconnected surfaces of those conducting surface pairs are respectively connected to a plurality of back-biased diode threshold detectors 38 (only one of which is shown in FIG. 1A for the sake of simplicity). The outputs of detectors 38, which constitute a program select or card identification binary signal or word as determined by the conducting surface pattern on the program select card, are respectively applied to the stages of a storage device, here shown as an eight-bit parallel in/serial out shift register 40.

Figure 5:
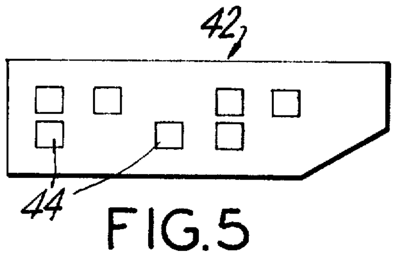
FIG. 5 illustrates a typical program-select card employed in the operation of the receiver of FIG. 1.

A typical program select card or ticket 42 for use with the receiver shown in FIGS. 1A and 1B is illustrated in FIG. 5. As therein shown, card 42 includes a plurality of conducting surfaces 44 arranged in a preselected binary pattern in five rows and two columns. That is, the presence of a conducting surface 44 on the card corresponds to one binary level, and the absence of such a surface in the array corresponds to the other binary level. The binary card identification word developed by card reader 20 that is stored in shift register 40 is determined by the arrangement of conducting surfaces 44 in the bottom four rows of the card; the oscillator or channel select binary signal applied to channel select logic circuit 22 is determined by the pattern of the conductor surfaces in the upper row of the card.

In use, when card 42 is inserted into card reader 20, the conducting surfaces 44, whenever present on the card, bridge one of the pairs of conducting surfaces in the card reader, to thereby increase the coupling capacitance between that pair of conducting surfaces. That increased capacitance is effective to couple a signal applied to one of the surfaces of the conductor pair from oscillator 34 to the other conducting surface in that pair. Thus, for example, if one of the conducting surfaces 44 on card 42 bridges the pair of conducting surfaces 1—1, a sufficiently high level signal from oscillator 34, corresponding to a logic "1", is coupled through that pair of conducting surfaces to one input of channel select logic circuit 22. If no conducting surface is present on the card to bridge the conducting surfaces 1—1, no appreciable signal, corresponding to a logic "0", is applied to that input of the channel select logic circuit. In this manner, a two-bit channel select binary signal is applied to logic circuit 22 that is determined by the presence or absence of a conducting surface on the card to respectively bridge conducting surfaces 1—1 and 2—2 in the card reader.

Similarly, if a conductor surface on the card is present to bridge the conducting surfaces 8—8, the signal from oscillator 34 (when gate 36 is open) is coupled to the associated threshold detector 38, which, in response thereto, produces an output signal at a logic "1" level. That signal is applied to the stage of shift register 40 allocated to that pair of conducting surfaces, to thereby store a logic "1". If no conductor surface is present on card 42 to bridge that conductor pair, the output of the threshold detector 38 remains low and a logic "0" signal is applied to the corresponding stage of the shift register. In this manner an 8-bit card-identification binary word is stored in shift register 40 that corresponds to the presence or absence of conducting surfaces on the lower four rows of the program-select card.

Figure 2:
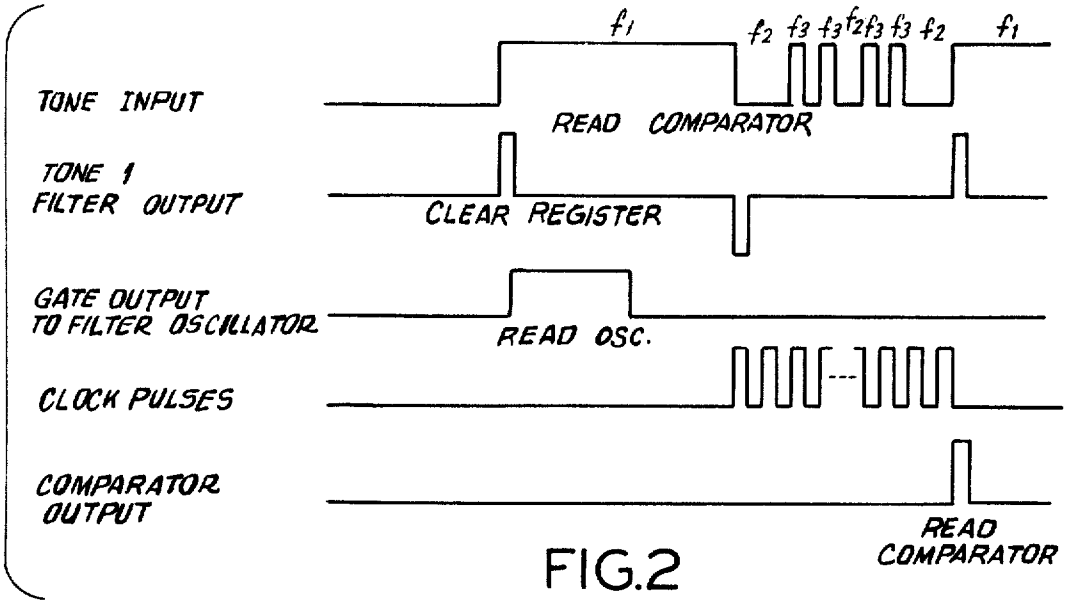

As noted previously, the transmitted scrambled television signal also includes a program identification signal. As shown in FIG. 2, for example, the television transmitted signal may include a sync signal at a frequency $f_1$ followed by an 8-bit binary coding signal consisting of eight tones at either frequency $f_2$ or $f_3$ that respectively correspond to logic "1" and logic "0" signals. The combination sync and coding signal is contained in the output of mixer 12. That signal is applied to the input of a sound detector 46 where the sync and coding signals as well as the audio portion of the selected television signal are detected.

Figure 3A:
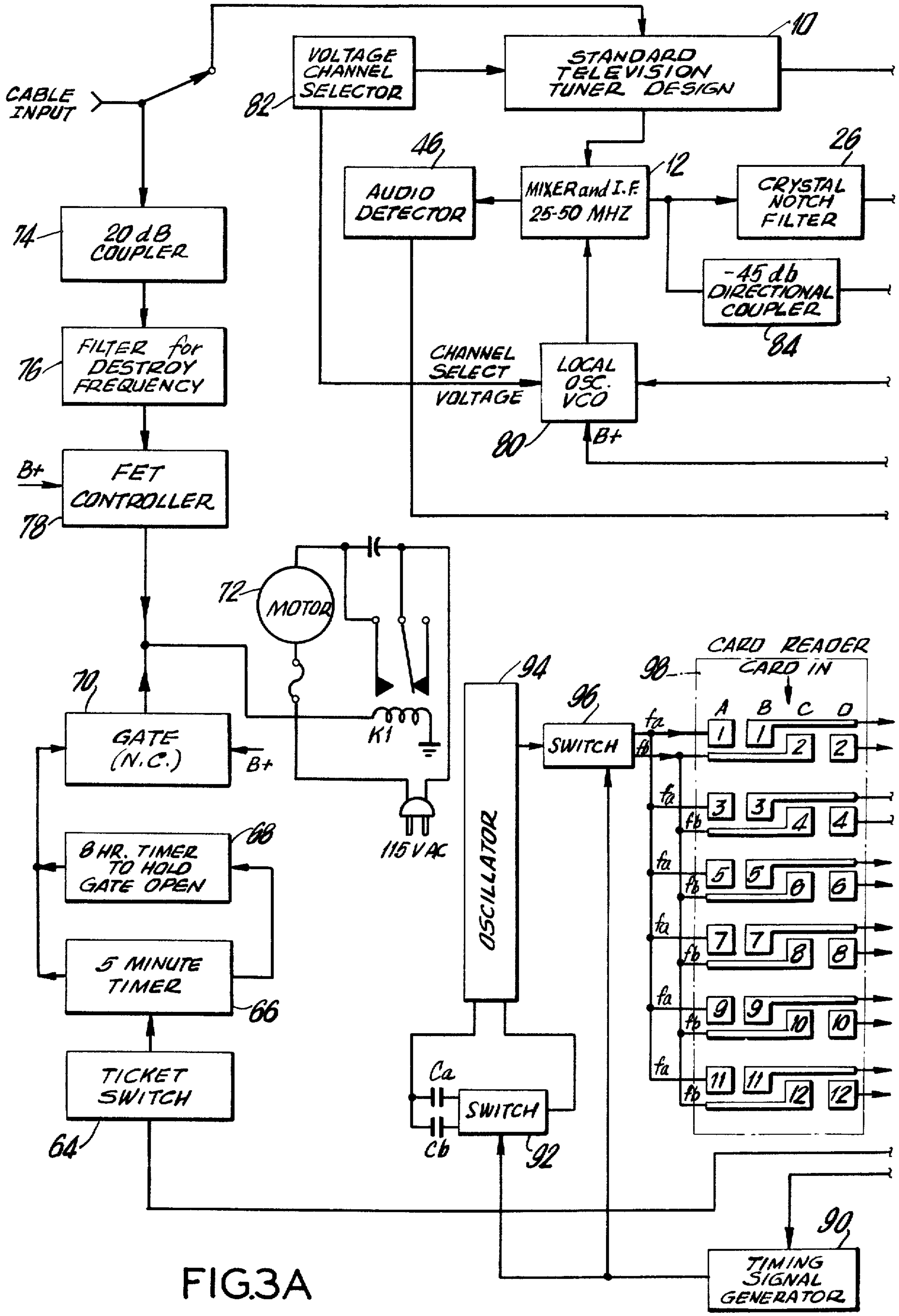

The output of detector 46 is connected to a sync frequency (e.g., 20 KHz) or tone 1 filter 48, and to a code tone filter 50 tuned to the code frequencies $f_2$ and $f_3$, which may be, for example, 23 and 25 KHz, respectively. The output of sync tone 1 filter 48, shown in FIG. 3, is applied to a detector 52 which detects the leading edge of the sync tone to generate a leading edge gate that is applied to gate 36 to close that gate and permit the output of oscillator 34 to be applied to the conducting surfaces on the card reader. The leading edge of the sync tone is also used to clear the shift register.

The output of code tone filter 50 is applied to a frequency shift key (FSK) detector 54 which converts the tones at frequencies $f_2$ and $f_3$ to logic "1"s and "0"s respectively. Those coded binary signals are applied to one input of a binary comparator 56 which also receives a read signal from detector 52 as the leading edge of the sync tone. The output of code tone filter 50 is also applied to a clock pulse generator 58 which produces a series of clock signals (fourth row of FIG. 2) which are applied serially to the read-out terminals of shift register 40 to serially read out the 8-bit card identification code signal previously stored in the shift register as described above to a second input of comparator 56. In this manner, two 8-bit binary words are synchronously applied to the inputs of the comparator. When the two 8-bit words bear a predetermined correlation to one another (e.g., when they are identical or the logical inverse of one another), comparator 56 produces a decoder-enabling signal at the occurrence of the next read signal. That enabling signal is applied to a gate 60 to turn that gate on and thereby apply a B+ signal to a switch logic and one-minute hold circuit 62, which in turn in connected to fixed local oscillator 24.

Circuit 62 includes an RC charging circuit which is charged by the B+ signal in a manner causing the B+ voltage to be applied to oscillator 24 for one minute, to thereby enable the oscillator for that period. When oscillator 24 is thus enabled, its output along with the output of filter 26 are heterodyned in mixer 28 to produce an unscrambled television signal at the channel 3 frequency. The output signal from logic switch 62 is applied to logic switch 29 to cause the latter to pass only the output of mixer 28, that is, the selected and unscrambled pay television signal, to channel amplifier 30 and to the TV receiver. The program identification code signal is transmitted several times a minute and preferably several times a second, so that oscillator 24 is continuously actuated upon the generation of the enabling signal so long as the program identification code is continued to be received and the program select card is in its operative position in the card reader to generate the matching card identification signal.

The insertion of the program select card 42 into the card reader also operates a switch 64, which when operated, turns on a 5-minute timer 66 disconnecting the B+ supply from a relay coil K1, and simultaneously charges an 8-hour RC timer circuit 68 for five minutes after which, timer circuit 68 causes a gate 70 to open and to remain open for eight hours. At the end of this 8-hour viewing period, gate 70 is once again closed and a B+ voltage is passed through gate 70 to energize relay coil K1 and thereby cause a motor 72 to operate. The operation of motor 72 in this manner causes the program-select card to be destroyed by any suitable mechanism (not shown), thereby terminating receiver operation.

The program select card may also, if desired, be destroyed in response to a destroy tone signal transmitted along with the scrambled television signal and program identification code signal. To this end, the input cable is also coupled through a 20 db coupler 74 to a narrow-pass destroy frequency filter 76 which passes the destroy signal to an FET controller 78. Controller 78, upon receiving the destroy signal, permits a B+ voltage to flow through relay K1 to thereby operate motor 72 and destroy the ticket.

The embodiment of the invention illustrated in FIG. 3 provides an increased number of possible program identification codes and also enables the subscriber to retransmit billing or polling information over the cable in binary form. The embodiment of FIG. 3 is similar in several respects to that illustrated in FIG. 1 and corresponding elements and circuits in the two embodiments are designated by corresponding reference numbers. The embodiments differ primarily in the manner of selecting the pay television channel, the manner of unscrambling the selected pay television signal, and the manner of operation of the card reader.

In the operation of the receiver illustrated in FIG. 3, the insertion of a program select card into the card reader operates a ticket switch 64, which in addition to the function performed by that switch in the previously described embodiment, also enables gate 60 for a one-minute period to thereby apply a temporary enabling signal to a voltage-controlled local oscillator 80, as well as to the fixed local oscillator 24 and the logic controlled switch.

The channel select voltage that determines the frequency of the output signal of oscillator 80 is provided by a voltage channel selector switch 82. Switch 82 supplies the channel select voltage to oscillator 80 only when switch 82 is operated by the subscriber to one of the pay television channel positions. The magnitude of the voltage represents the selected pay-television channel such that the mixing signal produced by oscillator 80 corresponds to the selected channel.

The output of oscillator 80 is applied to mixer 12 which also receives the scrambled television signal from the first i.f. stage of tuner 10. The output of mixer 12 is applied to a crystal notch filter 26 which removes the interfering signal as described previously with respect to the embodiment of FIG. 1. The output of filter 26 is applied to one input of mixer 28 which receives at its other input the output of fixed local oscillator 24 which is turned on only when it receives an enabling signal from gate 60.

The output of mixer 12 is also coupled through a 45 db coupler 84 to one input of a phase and amplitude comparator 86, which also receives the output of filter 26. The output of phase and amplitude comparator 86 is applied to an automatic frequency control circuit 88, the output of which is applied to the frequency control terminal of the voltage-controlled oscillator 80.

If the output from notch filter 26 at the frequency at which the amplitude comparator is tuned is less than the output from the minus 45 db directional coupler 84, zero volts is applied to AFC circuit 88 and the output of the voltage controlled local oscillator remains at the frequency previously established by the voltage derived from voltage channel selector 82. On the other hand, if the output of filter 26 exceeds the output of directional coupler 84, the phase comparison circuit compares the phase of the output of the notch filter of the residual interfering signal with the phase of the output of directional coupler 84.

If the phase angle difference is positive, comparator 86 applies a positive voltage to AFC circuit 88 which in turn modifies the frequency of voltage controlled oscillator 80 in the direction to reduce the output of notch filter 26 below that of directional coupler 84. If the phase angle is negative, the phase comparator applies a negative voltage to the AFC circuit which tunes voltages controlled oscillator 80 in the opposite direction so as to center the interfering signal in the crystal notch filter. For optimum operation of the circuit, the db coupling factor of directional coupler 84 should be commensurate with the depth of the notch in filter 26.

The output of notch filter 26 with the interfering signal removed is applied to one input of a mixer 28, where it is heterodyned with the output of fixed local oscillator 24 which is actuated temporarily by the insertion of the card into the card reader and subsequently by the detection of a code match between the program and card identification codes as will be further described below. The output of mixer 28 is applied to one input of a logic controlled switch, which couples the unscrambled subscription signal output from mixer 28 to channel amplifier 30, from where the signal is applied to the subscriber's conventional television receiver.

The output of mixer 12, as in the first embodiment, is applied to an audio detector 46 which detects the audio portion of the television signal which includes the sync and program identification signals. The output of detector 46 is applied to a tone 1 filter 48 which detects the sync pulse at frequency $f_1$ (FIG. 4), and to a code tone 2 and 3 filter 50. The tone 1 pulse is applied to detector and gate generator 52 which differentiates that pulse and applies the leading edge of the differentiated pulse to close gate 36. The closing of gate 36 in this manner applies a −15 volt signal to actuate a timing signal generator 90.

The output of generator 90 is a timed sequence of pulses which operates a switch 92 to thereby sequentially connect capacitors Ca and Cb into the frequency determining network of an oscillator 94 so as to cause oscillator 94 to sequentially produce signals at two distinct frequencies, *fa* and *fb*. The output of oscillator 94 at these two frequencies is sequentially and alternately applied through a switch 96, which is also controlled by the timed pulses generated by generator 90, to the conducting surfaces contained in a card reader 98.

The arrangement of the conducting surfaces in card reader 98 is similar to that of the first embodiment in that the surfaces are arranged in four columns A, B, C, and D and each row of the arrangement includes two adjacent pairs of such conducting surfaces. For example, the upper row of the card reader includes pairs of conducting surfaces 1—1 and 2—2 and the second row includes pairs of conducting surfaces 3—3 and 4—4.

The inner surfaces of each pair of conducting surfaces arranged in a common row are located adjacent to one another. One output line from switch 96 is connected to the first or column A conducting surface in each row, and the other output line of the switch is applied to the third or column C conducting surface on each row. In this manner signals at frequencies *fa* and *fb* are sequentially applied to the conducting surfaces in columns A and C respectively.

Figure 3B:
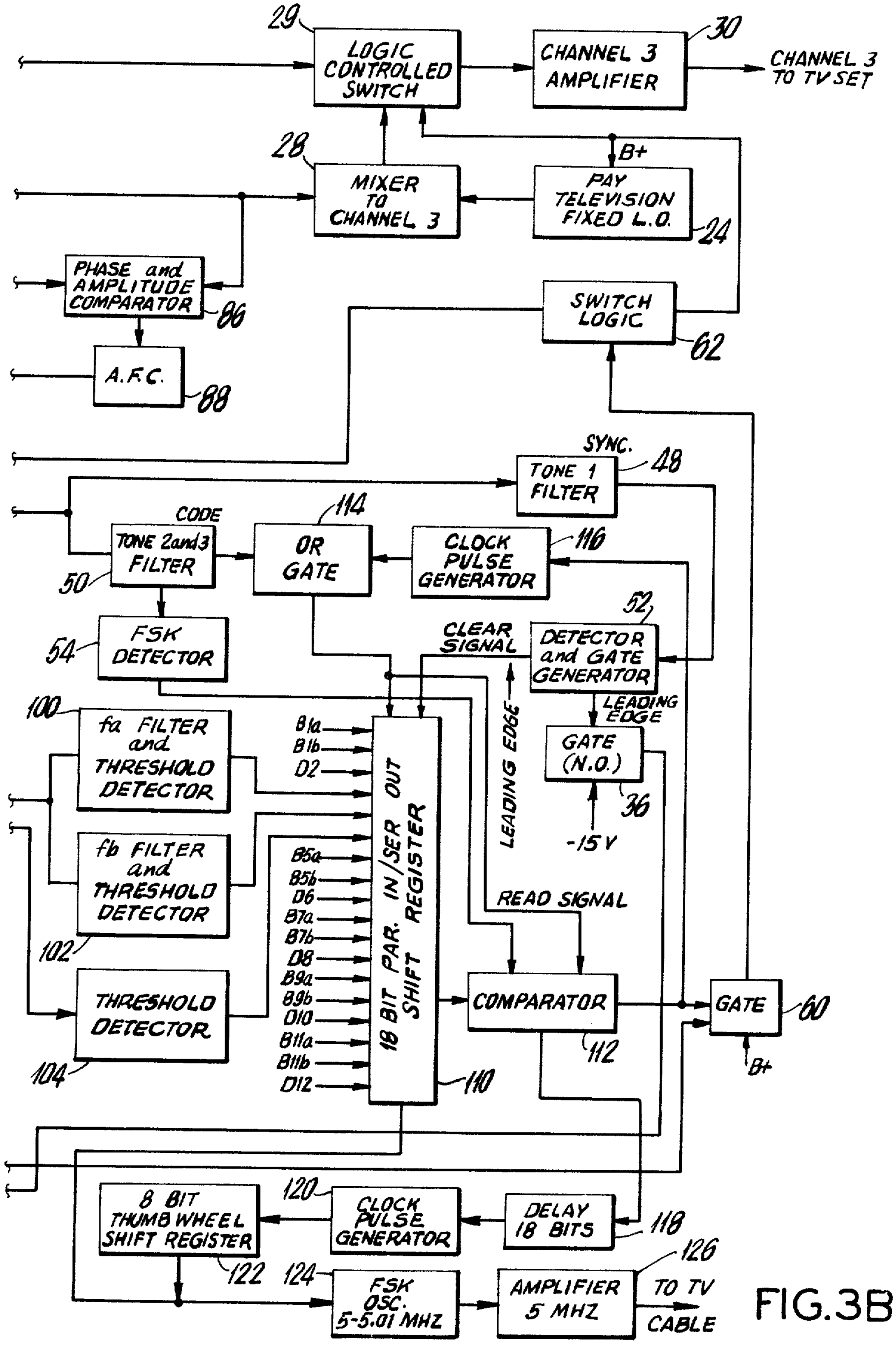

The second or column B conducting surface on each row of the card reader array is connected to an *fa* filter and threshold detector 100 and to an *fb* filter and threshold detector 102, and the fourth or column D conducting surface on each row is connected to a threshold detector 104. Filters and threshold detectors 100, 102, and 104 are shown in FIG. 3B as connected to only the second row of the card reader array for the sake of simplifying the drawing, it being understood that similar circuits are connected to corresponding conducting surfaces located in each row of the card reader array.

Figure 6:
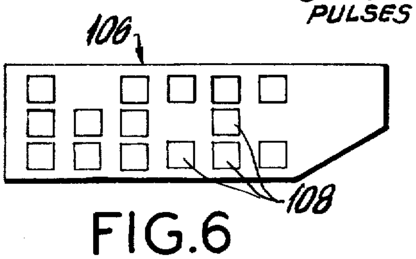
FIG. 6 illustrates a typical program select card employed in the operation of the receiver of FIG. 3.

A typical program-select card 106 for use with the receiver illustrated in FIG. 3 is illustrated in FIG. 6, which, as shown, includes three columns of conducting surfaces 108 arranged in six rows in a pattern corresponding to a designated binary code. The net capacitance between any two adjacent conducting surfaces in the card reader is normally too low to couple a sufficient amount of oscillator signal at either frequency *fa* or *fb* to the threshold detectors. However, when card 106 is inserted into the card reader, the conducting surfaces 108, where present on the card, capacitively bridge adjacent pairs of the conducting surfaces in the card readers to thereby increase the net capacitive coupling between those adjacent conducting surfaces and couple a sufficient amount of the oscillator output signal to the threshold detector circuits.

Again examining the second row of the card reader array, for purposes of example, if a conducting surface on card 106 bridges the adjacent 3—3 conducting surfaces of the card reader array, a signal at frequency *fa* is applied to filter and threshold detector circuits 100 and 102. However, only threshold detector circuit 100, which responds to a signal at frequency *fa*, produces an output signal at a logic "1" level. If a conducting surfaces is present on the program-select card to bridge the adjacent 3–4 conducting surfaces in the card reader, a signal at frequency *fb* is coupled across those conducting surfaces and is applied to the inputs of threshold detector circuits 100 and 102, but only the frequency *fb*-responsive circuit 104 produces an output signal at a logic "1" level. Similarly, when the adjacent 4—4 conducting surfaces on the card reader are bridged by a correspondingly located conducting surface on the program select card, a signal at a sufficiently high level is applied to threshold circuit 106 which thereupon produces an output logic "1" signal.

In this manner, the outputs of the threshold circuits 100, 102 and 104, which are respectively connected to the conducting surfaces in each row of the card reader array, is an 8-bit binary representation of the pattern in which the conducting surfaces are arranged on the program select card. The individual bits of the card identification word are respectively applied to and stored in the stages of an 18-bit shift register 110.

As in the previously described embodiment, the program identification code, which is to be compared with the card identification code, is transmitted along with the scrambled television signal as a series of pulses at frequencies *f2* and *f3*. Those pulses are applied from tone filter 50 to a frequency shift key detector 54 which produces a binary word corresponding to the sequency of the *f2* and *f3* signals in the program identification code.

The output of detector 54 and that of shift register 110 are applied to different inputs of a comparator 112. The output of filter 56 is also applied to one input of an OR gate 114. The other input of gate 114 receives a series of clock pulses generated by a clock pulse generator 116. Generator 116 applies a series of 18 clock pulses (FIG. 4) to shift register 110 in time synchronism with the program identification code signals. The stored card identification code binary word is thus synchronously applied serially along with the corresponding bits of the program identification code word into the comparator. When the comparator detects a bit-by-bit correspondence between the two input binary words, that is, when a match is detected between the card identification code and program identification code, an enabling signal is generated that is applied to and closes gate 60, thereby applying an enabling B+ voltage to switch logic circuit 62.

As described previously, the enabling signal produced upon the detecting of a code match is also applied to turn on oscillators 24 and 80 and logic switch 29 to permit the subscriber to view an unscrambled television program on the designated channel.

In the operation of a subscription television system, it is often desirable to permit the subscriber to transmit information, in binary form, back to the transmitter such as for billing and polling purposes. To this end, the receiver of FIG. 3 includes an 18-bit delay circuit 118, the output of which is in turn connected to a clock pulse generator 120. The output of pulse generator 120 is applied to an 8-bit thumb wheel 121 which is in turn coupled to an 8-bit shift register 122. The output of shift registers 110 and 122 are both applied to the input of a frequency shift key oscillator 124, the output of which is in turn applied to an R.F. amplifier 126. The output of amplifier 126 is coupled through the cable to the transmitter.

To poll the subscribers, a different series of 18-bit signals corresponding to the identification codes of all the subscribers being polled is sequentially transmitted.

The subscriber places a subscriber identification card into the card reader of the same general form illustrated in FIG. 6, but which contains a conducting pattern that uniquely identifies the subscriber and is not used for program selection.

Figure 4:
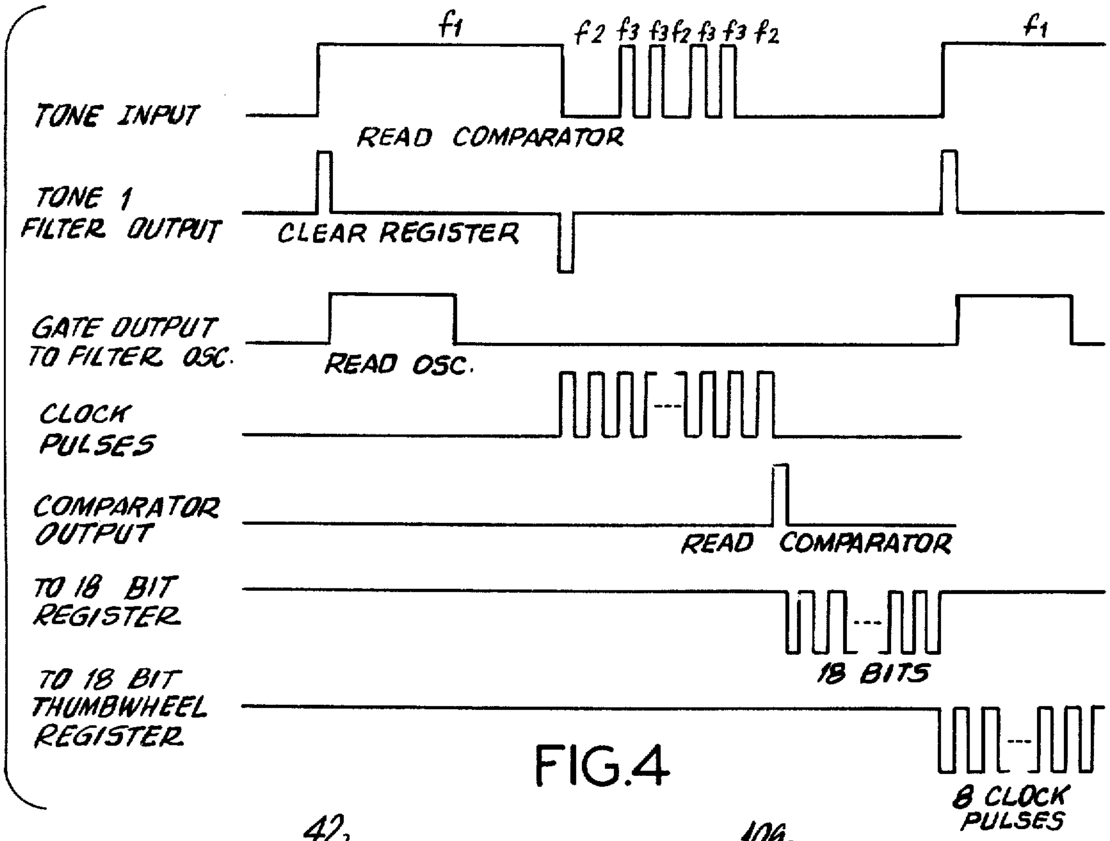
FIG. 4 is a series of timing diagrams of signals employed in the operation of the receiver system of FIG. 3.

When the received 18-bit identification code matches the subscriber's identification code, that match is detected in comparator 112 in the manner previously described. The receiver unscrambling circuitry is enabled to unscramble the program transmitted along with the subscriber code, and the resulting output of the comparator is applied to delay 118, where the comparator output pulse is delayed to produce a pulse delayed from the comparator output by 18-bits (FIG. 4). The subscriber provides the information requested in the unscrambled television signal by setting the thumb wheels 121 to a desired setting corresponding to the subscriber's response. The binary word thus established by the thumb wheel setting is applied into shift register 122. The delayed comparator pulse causes clock pulse generator 120 to produce a series of clock pulses (FIG. 4) which cause the 8-bit thumb wheel word to be read out of shift register 122 and combined at the input of FSK oscillator 124 with the preceeding 18-bit subscriber identification code word read out from shift register 110. The resultant input to oscillator 124 is a 26-bit word which combines the subscriber identification code and the requested polling information. FSK oscillator 124 converts that 26-bit word into a series of binary pulses at a frequency of 5.0 MHz. Those pulses are transmitted back to the transmitting station, where the information is reconverted to binary pulses and stored or processed in a known manner for the desired end purpose.

The information entered by the thumb wheel and retransmitted from the receiver along with the card identification code may also be employed for billing purposes, for entertainment, purchasing surveys, and the like. The rate at which the subscribers are polled is determined by the ultrasonic subcarrier frequency on which the subscriber codes are transmitted, the bandwidth made available to each subcarrier, and the number of subcarriers used. The number of available codes for an 18-bit system, as shown in FIG. 3, is $2_{18}$ or greater than 260,000. If required, the entire list of subscribers can be polled in about 7 minutes at a rate of 20,000 bits per second or 4.6 minutes at a 30,000 bit rate, either of which would readily fit in the available bandwidth allocated to the sound carrier in a standard television channel in addition to the normal program voice information. If desired, more than one television channel can be used.

It will thus be appreciated from the foregoing description of specific embodiments of the invention that the subscription television receiver of the invention reliably permits only subscriber-purchasers of the program select cards or tickets to view the transmitted television programs.

In a typical use of the receiver, the conduction surfaces on the program-select card are not visible and the card itself is in the form of a theatre ticket with printing thereon indicating the title of the program and the times during which that program may be viewed.

The same television program may be transmitted at different hours of a single day or a number of days, and the program identification code is transmitted along with the scrambled television program at predetermined intervals during the available viewing period. After the program-select card is used, that is, after the destroy signal is transmitted or the 8-hour timer is operated, the ticket is automatically destroyed and, of course, cannot be used again.

The provision of the large number of possible program identification codes that can be transmitted, particularly in the second embodiment, permits great flexibility in the number and variety of programs, and also permits the receiver to be employed for billing and polling purposes as well as for program selection and unscrambling. Although the ticket identification code is shown employed for channel selection as well as unscrambling only in the first-described embodiment, it can also be employed in the receiver of FIG. 3 as well, by the provision of additional conducting surfaces on the ticket, and by providing additional channel select logic circuitry of the type employed in the first embodment. In addition, other forms of scrambling and unscrambling may be employed including, for example, the inversion or removal of the sync and/or the video signal at the transmitter with an interfering carrier at 4.55 MHz above the video carrier, and the reconstruction of the sync and/or video signals with the use of a notch filter having a notch at 4.55 MHz in the receiver in response to the detection of a code match between the program and card identification codes to produce the unscrambling enabling signal in the manner described hereinabove. Moreover, where the interfering signal is at 4.55 MHz above the video carrier and the phase of the video information is inverted, the unscrambling may be performed using video detection with a notch filter having a notch at 4.55 MHz. The resultant unscrambled signal may then be remodulated for viewing at channel 3, for example. In addition, instead of the notch filter illustrated in the embodiments of the invention herein specifically described and illustrated, an independent discriminator could be used for automatic frequency control. Alternatively, the automatic frequency control loop may be replaced by a series of local oscillator crystals matched to the notch filter.

Thus, whereas the subscription television system of the invention has been hereinabove specifically described with respect to two presently preferred embodiments, it will be apparent that modifications may be made therein without necessarily departing from the spirit and scope of the invention.

What is claimed is:

1. A subscription television receiver for receiving a scrambled television signal including a series of tones at first and second frequencies, said receiver comprising means for receiving the scrambled television signal and said binary program identification signal, means for permitting, when enabled, the received scrambled television signal to be viewed in an unscrambled form, means for receiving a program-select card containing a first plurality of conductive areas selectively arranged on an insulating surface, the presence of one of said first plurality of conductive areas representing one binary level and the absence of one of said conductive areas representing a second binary level, whereby the arrangement of said first plurality of conductive areas on said cardd defines a binary card identification code, said card-receiving means comprising a member including a second plurality of conductive areas arranged in orthogonally intersecting rows and columns, each of said first plurality of conductive areas on said card being located when said card is received in said card-receiving means adjacent to but not in contact with adjacent ones of said second plurality of conductive areas, thereby to modify an electrical parameter of selected adjacent ones of said conductive areas, a signal source operatively connected to the conductive areas of one of said columns in said card-receiving means, switch means interposed between said signal source and said card-receiving means for applying, when actuated, the output of said signal source to the conductive areas on said one column, means for detecting the received binary program identification signal and including means for detecting said tones at said first frequency and said tones at said second frequency, means for actuating said switch means upon the detection of said first frequency tone, and means for producing a binary program identification signal corresponding to the sequence of said tones at said second frequency, means for comparing said card identification code signal and said program identification signal, and means for producing an enabling signal for said permitting means when said card identification code signal corresponds to said program identification signal.

2. The receiver of claim 1, further comprising a plurality of normally deactuated oscillators for producing, when actuated, signals at different frequencies, said card including additional channel select coded indicia thereon, said card-receiving means further including means for producing a channel select signal corresponding to said additional coded indicia, and channel select logic means coupled to said member for producing an actuating signal for one of said plurality of local oscillators in correspondence to said channel select signal.

3. The receiver of claim 2, in which said first plurality of conductive areas are arranged in a plurality of intersecting rows and columns, said first plurality of conductive areas wherever selectively present on said card when said card is received in said card receiving means overlying and thereby modifying an electrical parameter of selective adjacent ones of said second plurality of conductive areas.

4. The receiver of claim 3, further comprising a signal source operatively connected to the conducting surfaces of one of said columns in said card-receiving means, the change in said electrical parameter being effective to couple the signal from said source from said conductive area in said one column to the conductive area in the adjacent one of said columns.

5. The receiver of claim 1, further comprising means respectively connected to said adjacent conductive areas in said card-receiving means respectively producing an output at one binary logic level when said electrical parameter of adjacent conductive areas is thus modified by the presence of one of said first plurality of conductive areas on said card over said adjacent ones of said second plurality of conductive areas.

6. The receiver of claim 5, in which said electrical parameter is capacitance, said first plurality of conductive areas on said card which selectively overlie selected adjacent ones of said second plurality of conductive areas being effective to modify the effective net capacitance of said adjacent conductive areas.

7. The receiver of claim 6, further comprising switch means interposed between said signal source and said card-receiving means for applying when actuated the output of said signal source to said conductive areas in said one column in said card-receiving means.

8. The receiver of claim 7, in which said transmitted signal includes a first tone at a first frequency, said detecting means including means for detecting said first tone, and means operatively connected to said detecting means for actuating said switch means in response to the detection of said first tone signal.

9. The receiver of claim 8, in which said program identification signal includes a series of tones at at least a second frequency, said second frequency tones being detected at said detecting means, and means operatively connected to said detecting means for producing a binary word corresponding to said second frequency tones.

10. The receiver of claim 1, further comprising means operatively connected to said card receiving means for storing said card identification code signal, and means for transferring said stored card identification code signal to said comparison means in response to the detection of said first tone.

11. The receiver of claim 10, in which said permitting means includes a first local oscillator, a second local oscillator, a first mixer for mixing the received television signal with the output of said first local oscillator, means operatively connected to said first mixing means for restoring the received scrambled television signal to an unscrambled form, and second mixing means for mixing the output of said restoring means and that of said second local oscillator for producing a television signal capable of being viewed on a designated channel, one of said first and second local oscillators being actuated by said enabling signal.

12. The receiver of claim 11, in which said signal source includes means for sequentially applying signals at first and second frequencies to said conducting surfaces in said one column, said plurality of output producing means each including first and second means respectively responsive to said first and second frequencies.

13. The receiver of claim 12, further comprising storing means having a plurality of bit-storing stages, the outputs of said frequency responsive means being operatively connected to different ones of said stages.

14. The receiver of claim 13, further comprising manually operable means for producing a response binary word, storing means for storing a subscriber identification binary words in response to the insertion of a member containing subscriber identification indicia into said card-receiving means, and means operatively coupled to said storing means and said manually operable means for combining said response binary word with said subscriber identification binary word.

15. The receiver of claim 14, in which said manually operable means includes second storing means for storing said response word, and said combining means comprising delay means operatively coupled to said comparing means for delaying the output of said comparing means by a time corresponding to the bit length of said subscriber identification word to thereby produce a delayed signal, said stored response word being read out from said second storing means in response to said delay signal.

16. A subscription television receiver for receiving a scrambled television signal that includes a binary program identification signal, said receiver comprising means for receiving the scrambled television signal and said binary program identification signal, means for permitting, when enabled, the received scrambled television signal to be viewed in an unscrambled form, means for receiving a program-select card containing a first plurality of conductive areas selectively arranged on an insulating surface, the presence of one of said first plurality of conductive areas representing one binary level and the absence of one of said conductive areas representing a second binary level, whereby the arrangement of said first plurality of conductive areas on said card defines a binary card identification code, said card-receiving means comprising a member including a second plurality of conductive areas arranged in orthogonally intersecting rows and columns, each of said first plurality of conductive areas on said card being located when said card is received in said card-receiving means adjacent to but not in contact with adjacent ones of said second plurality of conductive areas, thereby to modify an electrical parameter of selected adjacent ones of said conductive areas, a signal source for sequentially applying signals at first and second frequencies to alternate ones of said columns in said card-receiving means, and means including means respectively responsive to said first and second frequencies and coupled to said columns in said card-receiving means for producing when said card is received in said card-receiving means a binary card identification code signal corresponding to the pattern of said first plurality of conductive areas on said card, means for detecting the received binary program identification signal, means for comparing said card identification code signal and said detected program identification signal, and means for producing an enabling signal for said permitting means when said card identification code signal corresponds to said detected program identification signal.

17. The receiver of claim 16, in which said television signal includes a tone at a first frequency and a series of tones at at least a second frequency and having a predetermined pattern, said detecting means comprising means for detecting said tones at said second frequency to develop said binary program identification signal corresponding to said pattern of said tones of said second frequency, said receiver further comprising means responsive to said tone at said first frequency for producing a clear signal, and means for applying said detected program identification signal to one input of said comparing means, said clear signal being effective when present to transfer said card identification code signal from said storing means to the other input of said comparing means.

18. The receiver of claim 16, further comprising means coupled to said card-receiving means and said comparing means having a plurality of bit-storing stages for storing said binary card identification code signal, the outputs of said frequency responsive means being operatively connected to different ones of the stages of said storing means.

19. A subscription television receiver for receiving a scrambled television signal that includes a binary program identification signal, said receiver comprising means for receiving the scrambled television signal and said binary program identification signal, means for permitting, when enabled, the received scrambled television signal to be viewed in an unscrambled form, means for receiving a program-select card containing a first plurality of conductive areas selectively arranged on an insulating surface, the presence of one of said first plurality of conductive areas representing one binary level and the absence of one of said conductive areas representing a second binary level, whereby the arrangement of said first plurality of conductive areas on said card defines a binary card identification code, said card-receiving means comprising a member including a second plurality of conductive areas arranged in orthogonally intersecting rows and columns, each of said first plurality of conductive areas on said card being located when said card is received in said card-receiving means adjacent to but not in contact with adjacent ones of said second plurality of conductive areas, means including said card and said member for producing when said card is received in said card-receiving means a binary card identification code signal corresponding to the pattern of said first plurality of conductive areas on said card, means for detecting the received binary program identification signal, means for comparing said card identification code signal and said detected program identification signal, means for producing an enabling signal for said permitting means when said card identification code signal corresponds to said detected program identification signal, manually operable means for producing a response binary word, storing means for storing a subscriber identification binary word in response to the insertion of a member containing subscriber identification indicia into said member-receiving means, and means operatively coupled to said storing means and said manually operable means for combining said response binary word with said subscriber identification binary word.

20. The receiver of claim 19, in which said manually operable means includes second storing means for storing said response word, and said combining means comprises delay means operatively coupled to said comparing means for delaying the output of said comparing means by a time corresponding to the bit length of said subscriber identification word to thereby produce a delayed signal, said stored response word being read out from said second storing means in response to said delayed signal.

* * * * *